US007544129B2

(12) United States Patent
Baerlocher

(10) Patent No.: US 7,544,129 B2

(45) Date of Patent: Jun. 9, 2009

(54) GAMING DEVICE HAVING MULTIPLE SELECTION GROUPS WITH RELATED PICKS

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 1067 days.

(21) Appl. No.: 10/657,365

(22) Filed: Sep. 8, 2003

(65) Prior Publication Data

US 2005/0054404 A1 Mar. 10, 2005

(51) Int. Cl.
*A63F 13/00* (2006.01)

(52) U.S. Cl. .......................................................... 463/9

(58) Field of Classification Search ....................... None
See application file for complete search history.

(56) References Cited

U.S. PATENT DOCUMENTS

| | | | |
|---|---|---|---|
| 4,003,578 | A | 1/1977 | Jones |
| 4,103,895 | A | 8/1978 | Pressman et al. |
| 4,182,515 | A | 1/1980 | Nemeth |
| 4,582,324 | A | 4/1986 | Koza et al. |
| 4,624,459 | A | 11/1986 | Kaufman |
| 4,695,053 | A | 9/1987 | Vazquez, Jr. et al. |
| 4,991,848 | A | 2/1991 | Greenwood et al. |
| 5,046,737 | A | 9/1991 | Fienberg |
| 5,092,598 | A | 3/1992 | Kamille |
| 5,116,055 | A | 5/1992 | Tracy |
| 5,205,555 | A | 4/1993 | Humano |
| 5,333,868 | A | 8/1994 | Goldfarb |
| 5,342,047 | A | 8/1994 | Heidel et al. |
| 5,380,007 | A | 1/1995 | Travis et al. |
| 5,401,023 | A | 3/1995 | Wood |
| 5,449,173 | A | 9/1995 | Thomas et al. |

(Continued)

FOREIGN PATENT DOCUMENTS

| | | | |
|---|---|---|---|
| EP | 0874337 | A1 | 10/1998 |

(Continued)

OTHER PUBLICATIONS

Crazy Fruits Brochure written by Atronic, published prior to Sep. 2000.

(Continued)

*Primary Examiner*—Ronald Laneau
*Assistant Examiner*—Tramar Harper
(74) *Attorney, Agent, or Firm*—K & L Gates LLP

(57) ABSTRACT

A game for a wagering gaming device including a plurality of levels of selections. The game provides the player with a number of picks. When the player makes a pick from one of the selection levels, the game reveals an outcome. The outcome can be a "repeat" outcome, wherein the pick counts and the player picks again from the same level. The outcome can be an "advance" outcome, wherein the pick counts and the player picks from a next selection level. The outcome can be a "pass" outcome, wherein the pick does not count against the player's total picks and which enables the player to pick from a next selection level. In general, the player's award is greater the more the player can pick from higher levels. In one embodiment, the pass enables the player to pick from a previous selection level.

34 Claims, 11 Drawing Sheets

U.S. PATENT DOCUMENTS 5,456,465 A 10/1995 Durham
5,542,669 A 8/1996 Charron et al.
5,611,535 A 3/1997 Tiberio
5,647,798 A 7/1997 Falciglia
5,711,525 A 1/1998 Breeding
5,743,524 A 4/1998 Nannicola
5,766,074 A 6/1998 Cannon et al.
5,769,716 A 6/1998 Saffari et al.
5,788,573 A 8/1998 Baerlocher et al.
5,833,538 A 11/1998 Weiss
5,855,514 A 1/1999 Kamille
5,868,619 A 2/1999 Wood et al.
5,873,781 A 2/1999 Keane
5,927,714 A 7/1999 Kaplan
5,947,820 A 9/1999 Morro et al.
5,964,463 A 10/1999 Moore, Jr.
5,980,384 A 11/1999 Barrie
5,996,997 A 12/1999 Kamille
5,997,401 A 12/1999 Crawford
6,004,207 A 12/1999 Wilson, Jr. et al.
6,015,346 A 1/2000 Bennett
6,016,338 A 1/2000 Bansal et al.
6,033,307 A 3/2000 Vancura
6,045,129 A 4/2000 Cooper et al.
6,056,642 A 5/2000 Bennett
6,059,289 A 5/2000 Vancura
6,062,980 A 5/2000 Luciano
6,089,976 A 7/2000 Schneider et al.
6,089,977 A 7/2000 Bennett
6,093,102 A 7/2000 Bennett
6,102,798 A 8/2000 Bennett
6,120,031 A 9/2000 Adams
6,126,542 A 10/2000 Fier
6,135,885 A 10/2000 Lermusiaux
6,149,156 A 11/2000 Feola
6,149,521 A 11/2000 Sanduski
6,159,095 A 12/2000 Frohm et al.
6,159,096 A 12/2000 Yoseloff
6,159,097 A 12/2000 Gura
6,159,098 A 12/2000 Slomiany et al.
6,165,070 A 12/2000 Nolte et al.
6,168,520 B1 1/2001 Baerlocher et al.
6,173,955 B1 1/2001 Perrie et al.
6,174,235 B1 1/2001 Walker et al.
6,186,894 B1 2/2001 Mayeroff
6,190,254 B1 2/2001 Bennett
6,190,255 B1 2/2001 Thomas et al.
6,203,429 B1 3/2001 Demar et al.
6,224,483 B1 5/2001 Mayeroff
6,231,442 B1 5/2001 Mayeroff
6,231,445 B1 5/2001 Acres
6,234,897 B1 5/2001 Frohm et al.
6,261,177 B1 7/2001 Bennett
6,270,409 B1 8/2001 Shuster
6,270,412 B1 8/2001 Crawford et al.
6,290,600 B1 9/2001 Glasson
6,296,568 B1 10/2001 Tracy
6,309,299 B1 10/2001 Weiss
6,309,300 B1 10/2001 Glavich
6,312,334 B1 11/2001 Yoseloff
6,315,600 B1 11/2001 Droesbeke
6,315,664 B1 11/2001 Baerlocher et al.
6,319,124 B1 11/2001 Baerlocher et al.
6,336,860 B1 1/2002 Webb
6,346,043 B1 2/2002 Colin et al.
6,347,996 B1 2/2002 Gilmore et al.
6,364,766 B1 4/2002 Anderson et al.
6,364,767 B1 4/2002 Brossard et al.
6,368,218 B2 4/2002 Angell, Jr.
6,375,187 B1 4/2002 Baerlocher
6,394,899 B1 5/2002 Walker
6,398,344 B1 6/2002 Allen
6,398,645 B1 6/2002 Yoseloff
6,406,369 B1 6/2002 Baerlocher et al.
6,413,161 B1 7/2002 Baerlocher et al.
6,416,408 B2 7/2002 Tracy et al.
6,435,500 B2 8/2002 Guimina
6,439,995 B1 8/2002 Hughs-Baird et al.
6,443,837 B1 9/2002 Jaffe et al.
6,450,883 B1 9/2002 O'Halloran
6,461,241 B1 10/2002 Webb et al.
6,464,582 B1 10/2002 Baerlocher et al.
6,494,785 B1 12/2002 Gerrard et al.
6,506,118 B1 1/2003 Baerlocher et al.
6,511,375 B1 * 1/2003 Kaminkow .................. 463/20
6,514,141 B1 2/2003 Kaminkow et al.
6,517,074 B1 2/2003 Moody et al.
6,558,254 B2 5/2003 Baerlocher et al.
6,561,904 B2 5/2003 Locke et al.
6,569,015 B1 5/2003 Baerlocher et al.
6,572,473 B1 6/2003 Baerlocher
6,575,830 B2 6/2003 Baerlocher et al.
6,582,307 B2 6/2003 Webb
6,585,591 B1 7/2003 Baerlocher et al.
6,595,854 B2 7/2003 Hughs-Baird et al.
6,599,185 B1 7/2003 Kaminkow et al.
6,599,192 B1 7/2003 Baerlocher et al.
6,602,135 B1 8/2003 Gerrard
6,602,137 B2 8/2003 Kaminkow et al.
6,607,437 B2 8/2003 Casey et al.
6,607,438 B2 8/2003 Baerlocher et al.
6,632,141 B2 10/2003 Webb et al.
6,634,943 B1 10/2003 Baerlocher
6,648,754 B2 11/2003 Baerlocher et al.
6,666,765 B2 12/2003 Vancura
6,672,958 B2 1/2004 Bennett
6,676,516 B2 1/2004 Baerlocher et al.
6,692,356 B2 2/2004 Baerlocher et al.
6,708,975 B1 3/2004 Fox et al.
6,719,630 B1 4/2004 Seelig et al.
6,722,981 B2 4/2004 Kaminkow et al.
6,722,982 B2 4/2004 Kaminkow et al.
6,726,427 B2 4/2004 Jarvis et al.
6,733,386 B2 5/2004 Cuddy et al.
6,749,502 B2 6/2004 Baerlocher et al.
6,749,504 B2 6/2004 Hughs-Baird
6,769,983 B2 8/2004 Slomiany
6,780,104 B2 8/2004 Fox
6,780,107 B2 8/2004 Baerlocher et al.
6,783,457 B2 8/2004 Hughs-Baird et al.
6,786,819 B2 * 9/2004 Baerlocher et al. ............ 463/20
6,814,664 B2 11/2004 Baerlocher et al.
6,817,944 B2 11/2004 Kaminkow et al.
6,832,959 B2 12/2004 Baerlocher
6,837,793 B2 1/2005 McClintic
6,843,722 B2 1/2005 Webb
6,863,606 B1 * 3/2005 Berg et al. .................... 463/16
6,875,108 B1 4/2005 Hughs-Baird et al.
6,899,620 B2 5/2005 Kaminkow et al.
6,913,533 B2 7/2005 Cuddy et al.
6,932,701 B2 8/2005 Glavich et al.
6,966,833 B2 11/2005 Kaminkow et al.
6,969,316 B2 11/2005 Jarvis et al.
6,995,751 B2 2/2006 Falvo
7,037,191 B2 5/2006 Rodgers et al.
7,040,984 B2 5/2006 Mead
7,056,209 B2 6/2006 Baerlocher et al.
7,121,942 B2 10/2006 Baerlocher
7,153,205 B2 12/2006 Baerlocher
7,160,186 B2 1/2007 Cuddy et al.
7,160,188 B2 1/2007 Kaminkow et al.
7,172,506 B2 2/2007 Baerlocher et al.
7,175,521 B2 2/2007 McClintic
7,175,523 B2 2/2007 Gilmore et al.

| | | | | |
|---|---|---|---|---|
| 7,182,689 | B2 * | 2/2007 | Hughs-Baird et al. | 463/20 |
| 7,235,011 | B2 | 6/2007 | Randall et al. | |
| 7,264,545 | B2 | 9/2007 | Maya et al. | |
| 7,273,415 | B2 * | 9/2007 | Cregan et al. | 463/25 |
| 7,294,055 | B2 | 11/2007 | Baerlocher et al. | |
| 7,300,348 | B2 | 11/2007 | Kaminkow et al. | |
| 7,303,469 | B2 | 12/2007 | Kaminkow et al. | |
| 7,314,409 | B2 | 1/2008 | Maya et al. | |
| 7,318,773 | B2 | 1/2008 | Baerlocher | |
| 7,338,367 | B2 | 3/2008 | Kaminkow et al. | |
| 7,371,169 | B2 | 5/2008 | Baerlocher | |
| 7,399,228 | B2 | 7/2008 | Baerlocher | |
| 2002/0025844 | A1 | 2/2002 | Casey et al. | |
| 2002/0045475 | A1 * | 4/2002 | Glavich et al. | 463/20 |
| 2002/0052232 | A1 | 5/2002 | Kaminkow | |
| 2002/0072402 | A1 | 6/2002 | Baerlocher | |
| 2002/0137559 | A1 | 9/2002 | Baerlocher | |
| 2002/0142822 | A1 | 10/2002 | Baerlocher et al. | |
| 2002/0151350 | A1 | 10/2002 | Baerlocher et al. | |
| 2002/0155883 | A1 | 10/2002 | Baerlocher | |
| 2003/0013514 | A1 | 1/2003 | Cregan et al. | |
| 2003/0036422 | A1 | 2/2003 | Baerlocher et al. | |
| 2003/0040355 | A1 | 2/2003 | Baerlocher | |
| 2003/0045344 | A1 | 3/2003 | Webb et al. | |
| 2003/0045348 | A1 | 3/2003 | Palmer et al. | |
| 2003/0045349 | A1 * | 3/2003 | Hughs-Baird | 463/25 |
| 2003/0060254 | A1 * | 3/2003 | Cuddy et al. | 463/16 |
| 2003/0064795 | A1 | 4/2003 | Baerlocher et al. | |
| 2003/0078096 | A1 * | 4/2003 | Kaminkow et al. | 463/25 |
| 2003/0092475 | A1 | 5/2003 | Fox | |
| 2003/0153378 | A1 | 8/2003 | Schlegel et al. | |
| 2003/0153383 | A1 * | 8/2003 | Baerlocher et al. | 463/25 |
| 2003/0162578 | A1 | 8/2003 | Baerlocher et al. | |
| 2004/0048644 | A1 | 3/2004 | Gerrard et al. | |
| 2004/0048649 | A1 | 3/2004 | Peterson et al. | |
| 2004/0053665 | A1 | 3/2004 | Baerlocher | |
| 2004/0063483 | A1 | 4/2004 | Wolf et al. | |
| 2004/0082374 | A1 * | 4/2004 | Maya et al. | 463/16 |
| 2004/0242315 | A1 | 12/2004 | Paulsen et al. | |
| 2004/0248639 | A1 | 12/2004 | Slomiany | |
| 2005/0020351 | A1 | 1/2005 | Baerlocher et al. | |
| 2005/0033461 | A1 | 2/2005 | Gerrard et al. | |
| 2005/0054419 | A1 * | 3/2005 | Souza et al. | 463/20 |
| 2005/0054435 | A1 | 3/2005 | Rodgers et al. | |
| 2005/0059461 | A1 | 3/2005 | Ching et al. | |
| 2005/0064928 | A1 | 3/2005 | Baerlocher et al. | |
| 2005/0101377 | A1 | 5/2005 | Baerlocher | |
| 2005/0197180 | A1 | 9/2005 | Kaminkow et al. | |
| 2005/0233795 | A1 | 10/2005 | Wolf | |
| 2006/0030401 | A1 | 2/2006 | Mead et al. | |
| 2006/0183528 | A1 | 8/2006 | Rodgers et al. | |
| 2006/0199628 | A1 | 9/2006 | Rodgers et al. | |
| 2007/0015566 | A1 | 1/2007 | Baerlocher et al. | |
| 2007/0060271 | A1 | 3/2007 | Cregan et al. | |
| 2007/0060300 | A1 | 3/2007 | Baerlocher | |
| 2007/0087809 | A1 | 4/2007 | Baerlocher | |
| 2007/0117606 | A1 | 5/2007 | Baerlocher et al. | |
| 2007/0129131 | A1 | 6/2007 | Kaminkow et al. | |
| 2007/0149269 | A1 | 6/2007 | Benbrahim | |

FOREIGN PATENT DOCUMENTS

| | | | |
|---|---|---|---|
| EP | 0945837 | A2 | 3/1999 |
| EP | 0926645 | A2 | 6/1999 |
| EP | 0984409 | A2 | 3/2000 |
| EP | 1 199 689 | | 4/2002 |
| EP | 1298607 | A | 4/2003 |
| GB | 2 092 797 | | 8/1982 |
| GB | 2 097 160 | | 10/1982 |
| GB | 2 113 881 | | 8/1983 |
| GB | 2144644 | | 3/1985 |
| GB | 2 333 880 | A | 8/1999 |
| GB | 2385701 | A | 8/2003 |
| WO | WO 97/32285 | | 9/1997 |
| WO | WO 00/12186 | | 3/2000 |
| WO | WO 01/74464 | | 10/2001 |
| WO | WO 03/026759 | | 4/2003 |
| WO | WO 03/049053 | | 6/2003 |
| WO | WO 2005/002697 | | 1/2005 |
| WO | WO 2005/015826 | | 2/2005 |

OTHER PUBLICATIONS

Jeopardy, www.absolute-playstation.com/api_review/rjeop.htm, available prior to Sep. 2003.

Money to Burn Brochure written by WMS Gaming, Inc., published prior to Sep. 2001.

Pyramid Game Show Description, printed from www.loogslair.com/gameshow/rules/pyramid.shtml on Jan. 21, 2005, available prior to Sep. 2003.

Pyramid Game Show Description, printed from www.chris-lambert.com/RULES/Pyramid.html on Jan. 21, 2005, available prior to Sep. 2003.

Run For Your Money Game Brochures (and Description) writtten by Barcrest, published prior to 2000.

Sphinx Brochure written by Atronic Casino Technology, Ltd., published in 1997.

Top Dollar Brochure written by IGT, published in 1998.

"Gaming Glossary," [online] [printed on Nov. 20, 2006]. Retrieved from the Internet at <URL:http://www.igt.com/Content/base.asp-?pid=8.17.36.14&bhcp=1>.

"Creating Video Poker Strategies via Computer Program," by Bob Dancer, Oct. 24, 2006, [online] [printed on Nov. 20, 2006]. Retrieved from the Internet at <URL:http://www.casinogaming.com/columnists/dancer/2006/1024.html>.

"These Hands Are Fit to Be Tied—Part 1 of 3," by Bob Dancer, Sep. 20, 2006, [online] [printed on Nov. 20, 2006]. Retrieved from the Internet at <URL:http://www.casinogaming.com/columnists/dancer/2006/0920.html>.

"These Hands Are Fit to Be Tied—Part 2 of 3," Bob Dancer, Sep. 27, 2006, [online] [printed on Dec. 20, 2006]. Retrieved from the Internet at <URL:http://www.casinogaming.com/columnists/dancer/2006/0926.html>.

"These Hands Are Fit to Be Tied—Part 3 of 3," by Bob Dancer, Oct. 4, 2006, [online] [printed on Dec. 20, 2006]. Retrieved from the Internet at <URL:http://www.casinogaming.com/columnists/dancer/2006/1004.html>.

"1 Casino Guide UK—Casino, Bingo, Poker & Betting Online," [online] [printed on Nov. 20, 2006]. Retrieved from the Internet at <URL:http://www.1casinoguide.co.uk/pokergames.htm>.

* cited by examiner

FIG. 14

40

70

| LEVEL | TRY AGAIN | CORRECT | PASS |
|---|---|---|---|
| 1 | 5 | 10 | 15 |
| 2 | 10 | 20 | 30 |
| 3 | 15 | 30 | 45 |
| 4 | 20 | 40 | 60 |
| 5 | 100 - 500 | – | – |

FIG. 15

40

80

| LEVEL | NO. OF SELECTIONS | TRY AGAIN | CORRECT | PASS |
|---|---|---|---|---|
| 1 | 5 | 3 | 2 | 0 |
| 2 | 5 | 3 | 1 | 1 |
| 3 | 4 | 2 | 1 | 1 |
| 4 | 4 | 2 | 1 | 1 |
| 5 | 3 | 3 | 0 | 0 |

GAMING DEVICE HAVING MULTIPLE SELECTION GROUPS WITH RELATED PICKS

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device, and in particular to a gaming device having a game such as a base or bonus game with multiple selection groups that increase player excitement and enjoyment.

Gaming machines currently exist with bonus schemes in which the player has one or more opportunities to choose a particular selection or symbol from a group of symbols. When a player chooses a symbol, existing games will either award the player a bonus value or terminate the bonus round. The outcome depends upon the particular symbol selected by the player.

In one existing game, when the player selects a masked symbol that awards a bonus value, the player receives the value and is provided with another chance to select another masked symbol. Each time the player selects an award symbol, the game provides the associated award and prompts the player to make another selection. The player then selects another symbol and the process continues until the player selects a symbol that terminates the bonus round. When the player selects a masked end-bonus symbol, the game displays a message such as "COLLECT". That message indicates that the bonus round has terminated, and the player collects any accrued values.

In the above type of game, the gaming device is programmed so that in each bonus round a certain number of symbols yield awards and a certain number of symbols end the game. The player selects value-associated outcomes from a finite number of selections until selecting an "end-bonus" outcome. While that game offers advantages in player appeal and excitement, there is a continuing need to develop new types of bonus games, which further enhance the level of player interaction, excitement and enjoyment.

U.S. Pat. No. 6,439,995, assigned to the assignee of the present invention, discloses a game ('the '995 game") having multiple selection groups, wherein the player advances from one group to the next when the player selects an "advance" symbol. That is, the player picks selections from a group until reaching an "advance". In the '995 game, the player wants to delay the pick of the "advance" as much as possible to collect as many awards as possible before receiving the "advance". Unlike the first game, however, when the player picks the "advance" in the '995 game the player proceeds to another selection group rather than to an end game outcome. The '995 game has achieved a certain level of commercial success. Nevertheless, a need exists to develop new pick-until type games with multiple selection groups.

SUMMARY OF THE INVENTION

The present invention provides a wagering game of a gaming device that can be implemented as a base or primary game or as a bonus or secondary game triggered by the base or primary game. The game includes a plurality of levels of selections and provides the player with a number of picks of the selections. When the player makes a pick from one of the selection levels, the game reveals an outcome. The outcome can be a "repeat" or "try again" outcome, wherein the pick counts and the player picks again from the same level. The outcome can be an "advance" or "correct" outcome, wherein the pick counts against the player's picks and the player picks from a next selection level. The outcome can also be a "pass" outcome, wherein the pick does not count against the player's total picks, and which enables the player to pick from a next selection level. Although not discussed in connection with one of the drawings, the present invention includes an optional "stay" outcome, which requires the player to pick again from the same selection group but does not count against the player's total picks. In general, the player's awards increases as the player advances through the levels.

In one embodiment, the gaming device provides the different selection levels on different screens of a video monitor. That is, after playing one level, the gaming device displays another screen. In an alternative embodiment, the gaming device provides multiple selection groups on the same screen of the video monitor. In one preferred embodiment, a touch screen operates with a video monitor to allow the player to simply pick the area of the display device displaying the desired selection. In another alternative embodiment, an additional outcome is possible, wherein the player picks again from the same selection group, but wherein the next pick does not count against the player's total number of picks.

In one embodiment, the game of the present invention is played via a game show theme. The game show presents a clue to the player and displays a plurality of selections that each relate to the clue. The game prompts the player to pick one of the selections. After picking one of the selections, the game reveals whether the player has to "try again" (i.e., the player has not picked the "correct" answer), or whether the player advances to the next selection level. The player can advance to the next selection level by picking a "correct" outcome or by picking a "pass" outcome. The "correct" outcome advances the player to the next selection level but counts against the player's total picks. Again, the "pass" selection advances the player to the next selection level but does not count against the player's total number of picks. In an alternative embodiment, the "pass" selection could count against the player's total number of picks.

The wagering game is structured so that the player wins more by picking in higher selection levels then does the player by picking in lower selection levels. The wagering game accomplishes this feature in one of a number of different manners. In one embodiment, the wagering game assigns or associates awards with the different outcomes of the player's picks. Awards may or may not be assigned to any combination of the "try again" outcome, the "correct" outcome, and the "pass" outcome. As the levels increase, the awards associated with each of the one or more outcomes also increase. In another embodiment, the wagering game provides an award upon reaching the next level. Here, the gaming device in essence provides the award for obtaining either the "correct" or "pass" outcome. In still another embodiment, the wagering game only provides an award for achieving either the "pass" or the "correct" outcome.

In one embodiment, the final level displays selections that provide relatively high value awards to the player. In one embodiment, due to the finality of the level, the selections do not yield the "correct" or "pass" outcomes. In one embodiment, however, the wagering game allows the player to go back to a selection level in which a player received a "pass" if the player has remaining picks after picking each of the selections in the final selection group.

After exhausting each of player's picks, the wagering game provides the accumulated award to the player. The award is provided in one or more of a varying number of manners. In one embodiment, the award is a number of credits for the gaming device. In another embodiment, the award is a multiplier of gaming device credits. In still another embodiment, the award is a non-monetary award, such as a free meal, merchandise or other similar benefit.

It is therefore an advantage of the present invention to provide a game with multiple selection levels.

Another advantage of the present invention to provide a game with a visually entertaining display.

A further advantage of the present invention to provide a game that is fun and exciting to play.

Another advantage of the present invention to provide a game involving multiple player picks and an element of perceived skill.

Additional features and advantages of the present invention are described in, and will be apparent from, the following Detailed Description of the Invention and the figures.

BRIEF DESCRIPTION OF THE FIGURES

FIG. 14 is a schematic representation of an area of memory within the gaming device that stores the different awards for the different award levels.

FIG. 15 is a schematic representation of an area of memory within the gaming device that stores different outcome profiles for different award levels.

DETAILED DESCRIPTION OF THE INVENTION

Figure 1A:
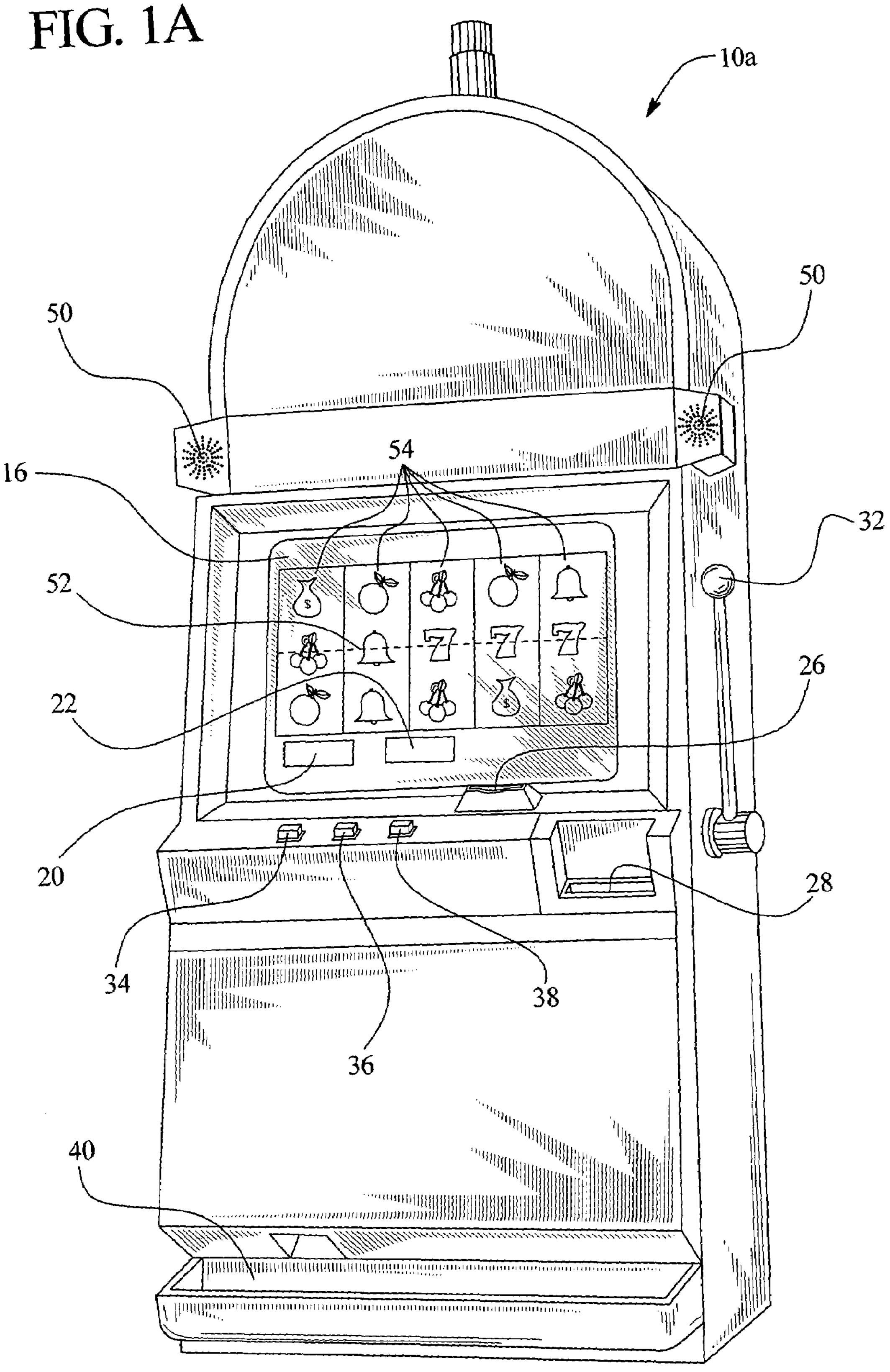
FIGS. 1A and 1B are front perspective views of various embodiments of a slot machine embodiment of the gaming device of the present invention.
Figure 1B:
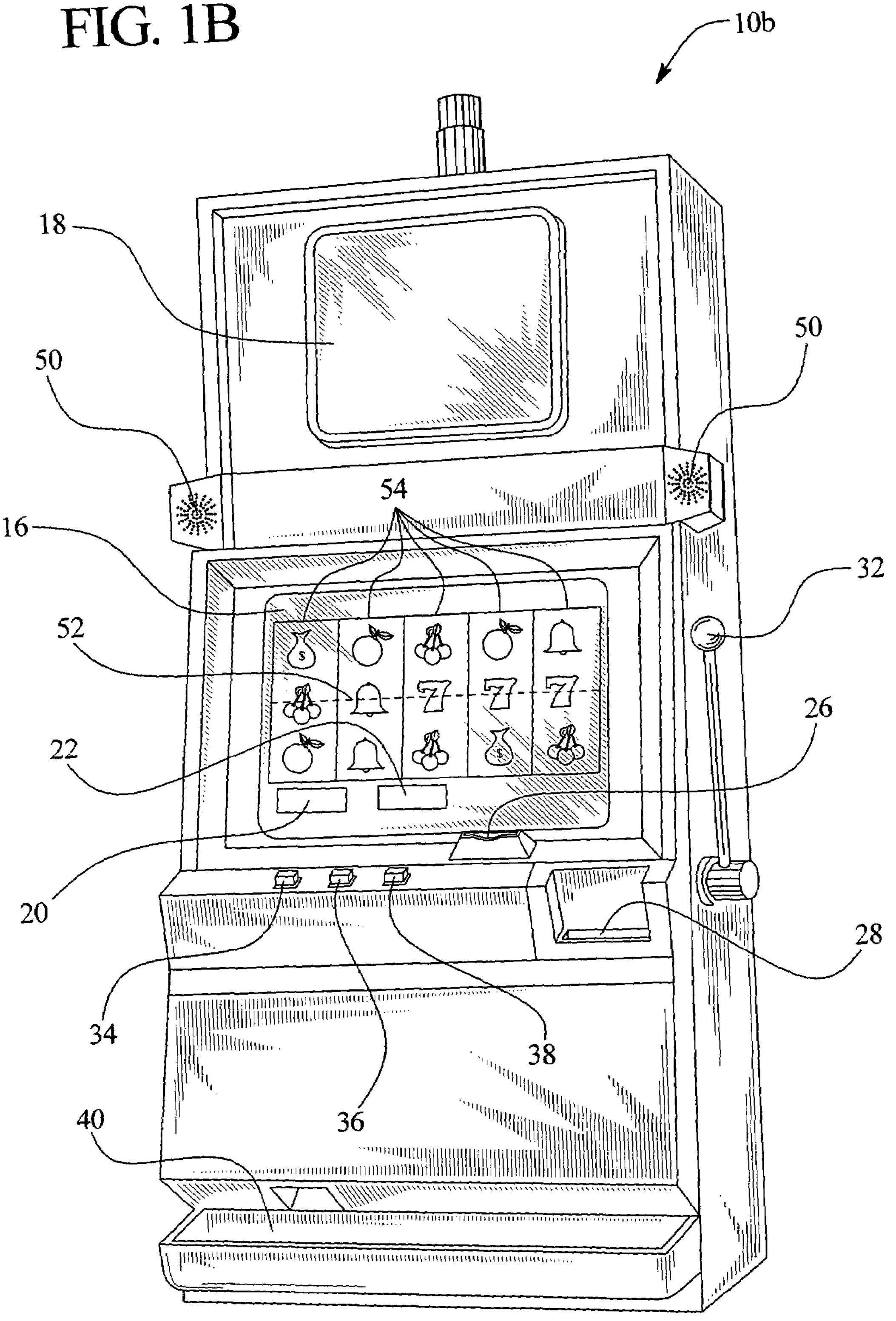

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, gaming device 10 has a support structure, housing or cabinet which provides support for a plurality of displays, inputs, controls and other features of a conventional gaming machine. It is configured so that a player can operate it while standing or sifting. The gaming device may be positioned on a base or stand or can be configured as a pub-style table-top game (not shown) which a player can operate preferably while sifting. Gaming device 10 can be constructed with varying cabinet and display configurations, as illustrated by the different configurations shown in FIGS. 1A and 1B.

Figure 2A:
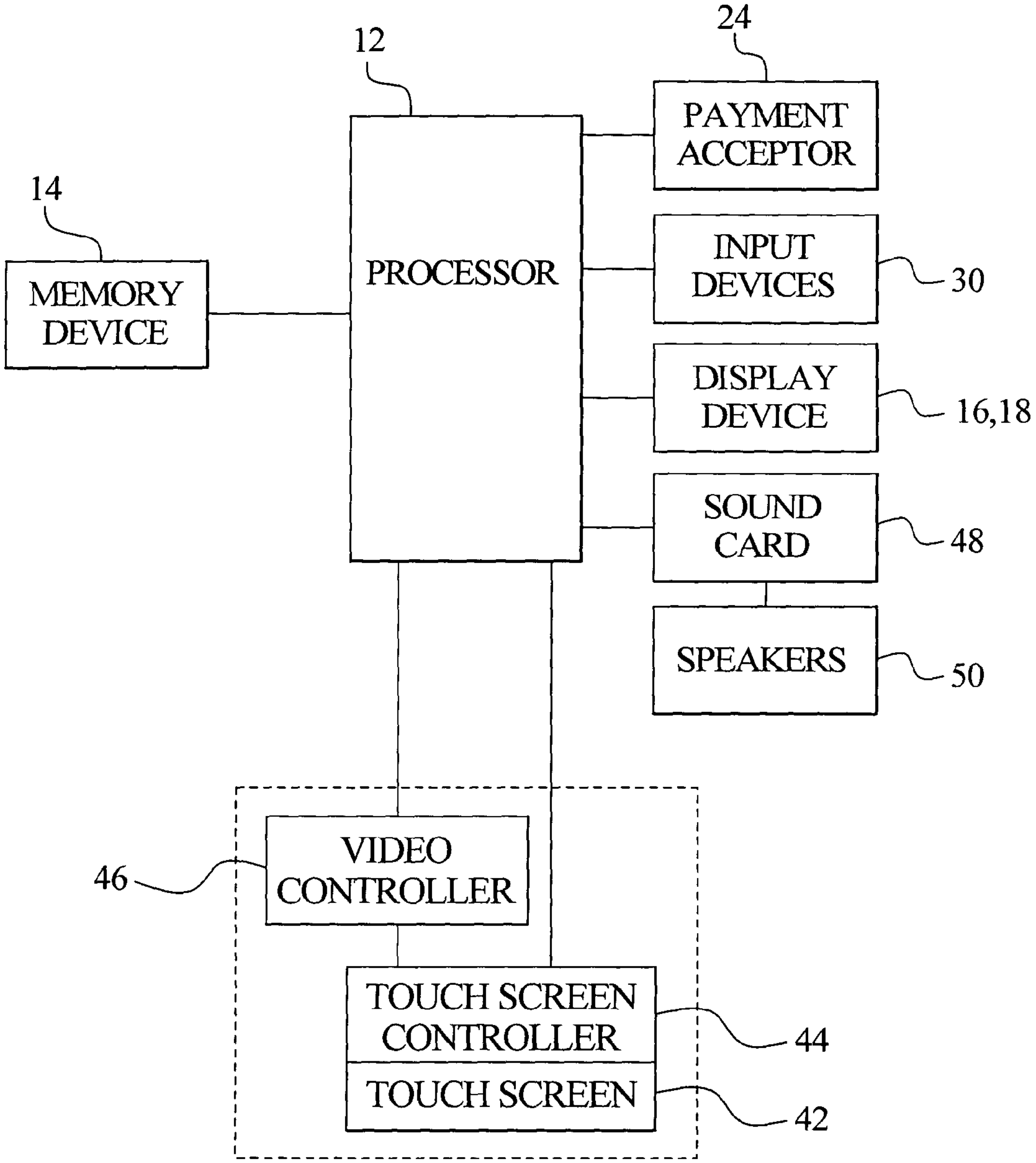
FIG. 2A is a schematic block diagram of the electronic configuration of one embodiment of the gaming device of the present invention.
Figure 2B:
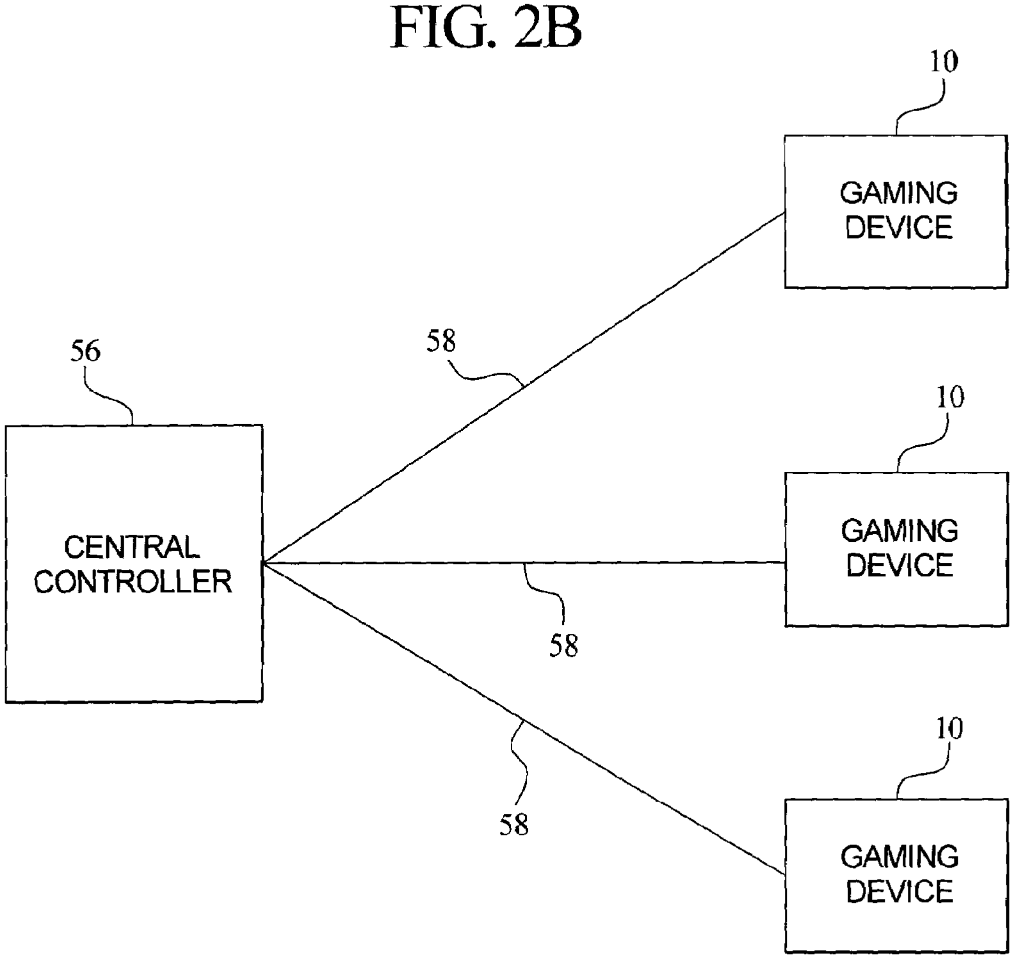
FIG. 2B is a schematic block diagram of various gaming devices employing the wagering game of the present invention, wherein the devices are networked or controlled remotely.

In one embodiment, as illustrated in FIG. 2, the gaming device preferably includes at least one processor 38, such as a microprocessor, a microcontroller-based platform, a suitable integrated circuit or one or more application-specific integrated circuits (ASIC's). The processor is in communication with or operable to access or to exchange signals with at least one data storage or memory device 40. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, gaming device 10 includes one or more display devices controlled by the processor. The display devices are preferably connected to or mounted to the cabinet of the gaming device. The embodiment shown in FIG. 1A includes a central display device 30 which displays a primary game. This display device may also display any suitable secondary game associated with the primary game as well as information relating to the primary or secondary game. The alternative embodiment shown in FIG. 1B includes a central display device 30 and an upper display device 32. The upper display device may display the primary game, any suitable secondary game associated with the primary game and/or information relating to the primary or secondary game. As seen in FIGS. 1A and 1B, in one embodiment, the gaming device includes a credit display 16 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display ("LCD"), a display based on light emitting diodes ("LED") or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which preferable moves one or more mechanical objects, such as one or more mechanical rotatable wheels, reels or dice, configured to display at least one and preferably a plurality of games or other suitable images, symbols or indicia.

In one embodiment, the gaming machine includes a camera in communication with the processor that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

In one embodiment, as seen in FIG. 2, the gaming device includes a sound generating device controlled by one or more sounds cards 42 which function in conjunction with the processor. In one embodiment, the sound generating device includes at least one and preferably a plurality of speakers 36 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

As illustrated in FIG. 2, in one embodiment, the gaming device includes at least one payment acceptor 58 in communication with the processor. As seen in FIGS. 1A and 1B, the payment acceptor may include a coin slot 12 and a payment, note or bill acceptor 14, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2, in one embodiment the gaming device includes at least one and preferably a plurality of input devices 44 in communication with the processor. The input devices can include any suitable device which enables the player to produce an input signal which is read by the processor. In one embodiment, after appropriate funding of the gaming device, the input device is a game activation device, such as a pull arm 18 or a play button 20 which is used by the player to start any primary game or sequence of events in the gaming device. The play button can be any suitable play activator such as a bet one button, a max bet button or a "repeat" bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 24. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 26. The player may push the cash out button and cash out to receive a cash payment or other suitable form of payment corresponding to the number of remaining credits. In one embodiment, when the player cashes out, the player receives the coins or tokens in a coin payout tray 28. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2, one input device is a touch-screen 50 coupled with a touch-screen controller 52, or some other touch-sensitive display overlay to allow for player interaction with the images on the display. The touch-screen and the touch-screen controller are connected to a video controller 54. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 56. The paylines may be horizontal, vertical, circular, diagonal, angled or any combination thereof. In this embodiment, the gaming device displays at least one reel and preferably a plurality of reels 34, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

In one embodiment, as illustrated in FIG. 2A, one or more of the gaming devices 10 of the present invention may be connected to a data network or a remote communication link 62 with some or all of the functions of each gaming device provided at a central location 60 such as a central server or controller. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Game

Referring now to FIGS. 3 to 12, one embodiment of the multiple level selection game of the present invention is illustrated. Those figures show example screen shots of the game, which can be displayed singly on display device 30 or 32 or in combination with one or more other screen shots simultaneously on display device 30 or 32. The wagering game of FIGS. 3 to 12 is explained in combination with an award table 70 illustrated in connection with FIG. 14. FIGS. 3 to 12 are various screen shots displayed on one of the display devices 30 or 32, wherein each screen shot shows a different award level. In an alternative embodiment, one or more screen shots includes or displays a plurality of selection levels.

The game is illustrated via a game show format, wherein the game provides clues to the player and the player picks a selection from a plurality of selections based on the clues. The game, in one embodiment, employs perceived skill by providing certain selections having indicia that relate more closely to a given clue than other selections. The game, however, can be controlled via random generation.

Figure 3:
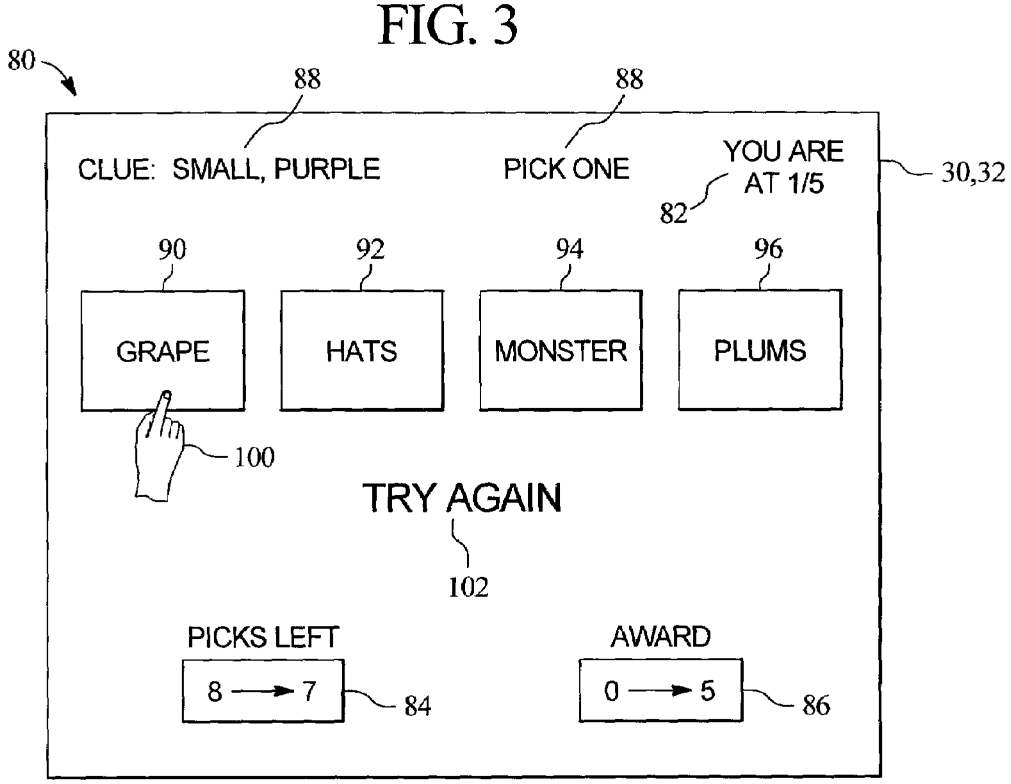
FIGS. 3, 4, 5, 6, 7, 8, 9, 10, 11 and 12 are elevation views of various screen shots of the gaming device illustrating one embodiment of the multiple selection level game of the present invention.

FIG. 3 illustrates a first screen 80 that is displayed on display device 30 or 32. The game informs the player via an audio, visual or audiovisual message 82 of the level from which the player is currently picking. In screen 80, the player picks from the first level out of a total of five levels. The game is adaptable to provide any suitable number of selection levels. Picks remaining indicator 84 shows the player the total number of picks that the player has to pick from each of the selection levels.

In the illustrated embodiment, the wagering game provides eight initial picks to the player. Award meter 86 shows the player's accumulated award. The awards of the present invention are: gaming device credits, a multiplier of gaming device credits, a number of picks from a prize pool, a number of free games, a number of free spins, a non-monetary award and any combination thereof. The game provides a clue to the player and prompts the player to pick one of the selections as seen by audio, visual or audiovisual message 88.

The player reads the clue, namely, the words "small, purple", and chooses from one of the selections 90 to 96, each of which display the respective indicia, '"grape", "hats", "monsters" and "plums". As illustrated by screen 80 of FIG. 3, player 100 picks the "grape" selection 90. The game then illustrates the result of that pick, namely, the "try again" outcome 102. The player's picks transition from eight to seven as seen in meter 84. The player receives an award of five, which is dictated by the "try again" column for level one in award table 70 of FIG. 14.

The "try again" outcome counts as a pick from the player's total number of picks and also requires the player to pick again from the same level, e.g., level one. The player obtains an award of five for achieving the "try again" outcome 102 in the illustrated embodiment. In another embodiment, the player does not win an amount upon picking the "try again" outcome 102.

The game distributes the outcomes upon the player picks in one of a variety of ways. In one embodiment, the wagering game assigns or associates the outcomes to the selections 90 to 96. In another embodiment, the game assigns the outcomes to the order of the pick with respect to other picks. That is, the gaming device associates a first outcome with the first pick and a second outcome with a second pick. This latter embodiment makes the selection that the player picks irrelevant. The player's entire game in that manner can be randomly determined prior to the time the player begins play.

Screen 80 of FIG. 3 illustrates one aspect of the game of the present invention, which is perceived skill. The selection 90 that displays the "grape" indicia and the selection 96 that displays the "plums" indicia are logically more closely related to the clue of "small, purple" than are the hats selection 92 and the monsters selection 94. The player 100 may thereby be enticed to pick selection 90 or selection 96 rather than selections 92 and 94. In reality, the indicia does not have any bearing on the outcome of the player's pick. The preset game is one of luck, not skill.

Figure 4:
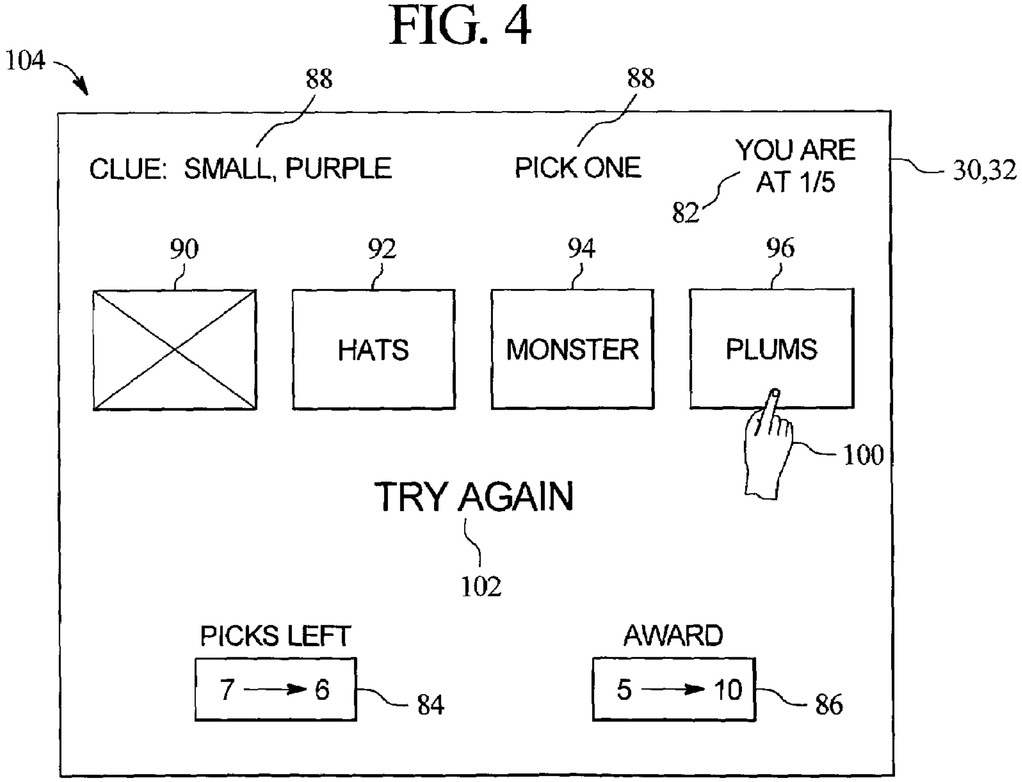

Screen 104 of FIG. 4 illustrates that the player's next pick is the "plums" selection 96. The game provides the same clue 88 and indicates that the player is still operating at the first selection level, as indicated by level indicator 82. Picks remaining meter 84 shows that the player's remaining picks has dropped to six.

The pick of the "plum" selection 96 again produces the "try again" outcome 102. Per the award table 70 of FIG. 14, the player receives again an award of five, resulting in a total accumulated award of ten as seen in meter 86.

Figure 5:
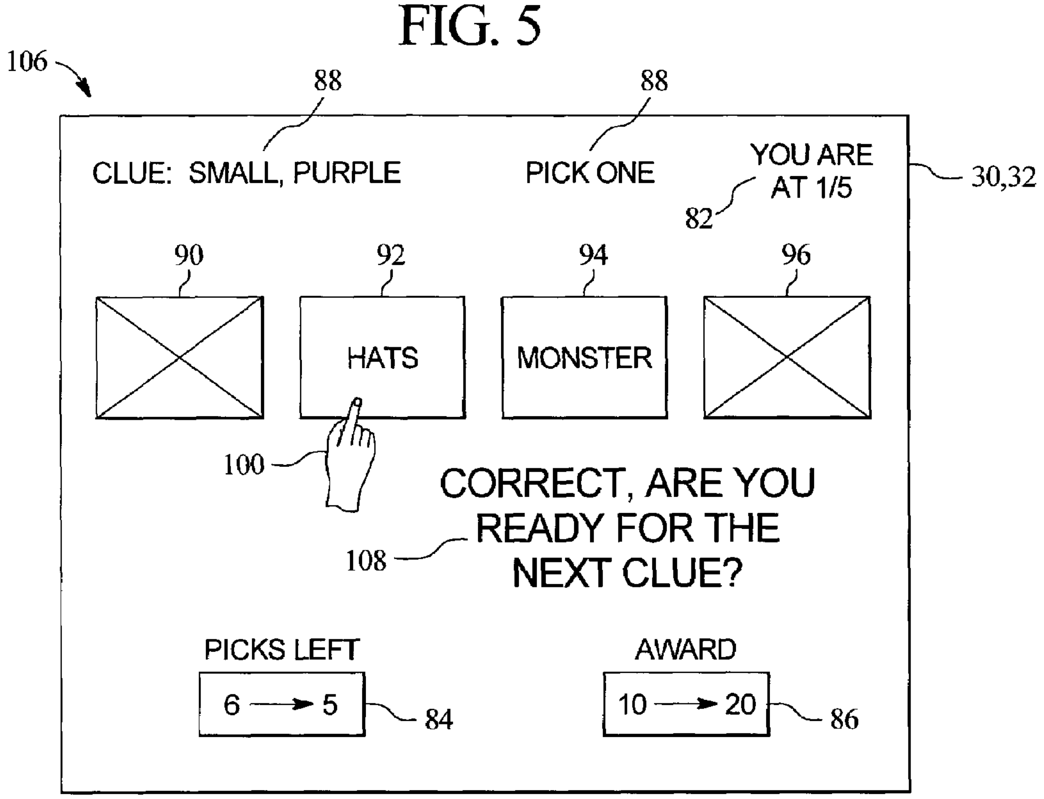

Display 106 of FIG. 5 shows that the player's next pick is the "hats" selection 92. In screen 106, the game again provides the message 88 and instructs the player to pick one of the selections. In the illustrated embodiment, the game does not allow the player to repick a previously picked selection and shows cross-out indicia indicating same. In an alternative embodiment, the player can pick the same selection twice, e.g., when outcomes are tied to the order of the pick rather than to the selection picked. In FIG. 5, the player is still currently at the first selection level as indicated by level indicator 82. The pick of the "hats" selection 92 yields a "correct" or "advance" outcome 108. As discussed above, the "advance" or "correct" outcome 108 counts against the player's total picks but allows the player to pick from the next highest or subsequent selection level. The picks remaining meter 84 shows that the player now has five remaining picks. The award meter 86 shows, according to table 70 of FIG. 14, that the player's award has currently accumulated by ten to twenty.

Figure 6:
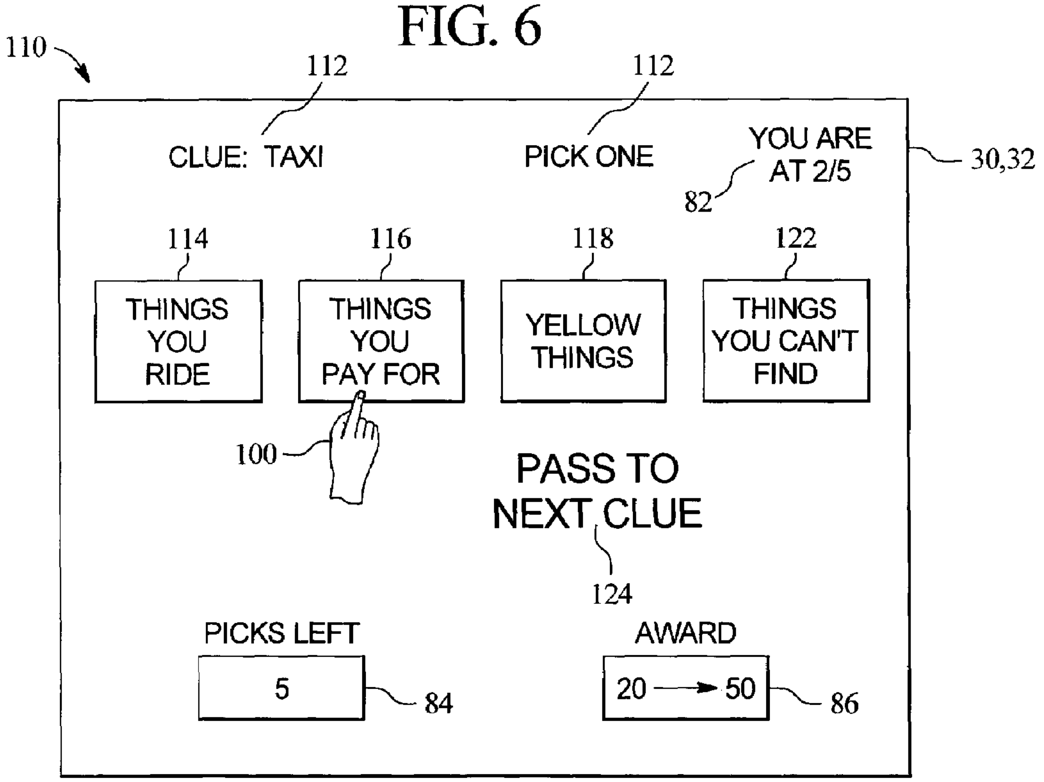

In FIG. 6, level indicator 82 shows that the player now picks from the second of five levels. The game displays a new clue, namely, the word "taxi". The game instructs the player to pick one of the selections via an audio, visual or audiovisual message 112.

In the second level, the game displays four new selections 114, 116, 118 and 122. Each of the selections relates to or provides an answer for the clue 112. The player 100 picks the "things you pay for" selection 116, which yields the "pass" outcome 124. As discussed above, the "pass" outcome allows the player to advance to the next or subsequent selection level without consuming a pick. In the illustrated embodiment, the "pass" outcome 124 also provides an award of thirty to the player per award table 70 of FIG. 14. The player's remaining picks accordingly remain at five as illustrated by picks remaining meter 84. The player's award increases to fifty as seen in display 86.

Figure 7:
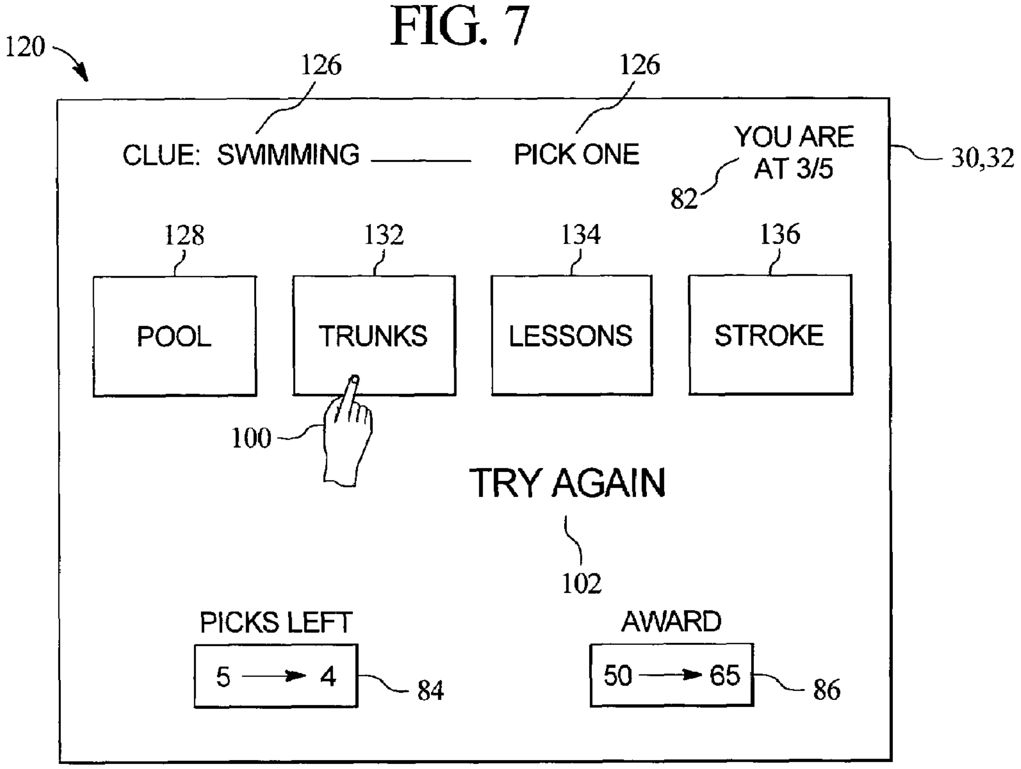
Figure 8:
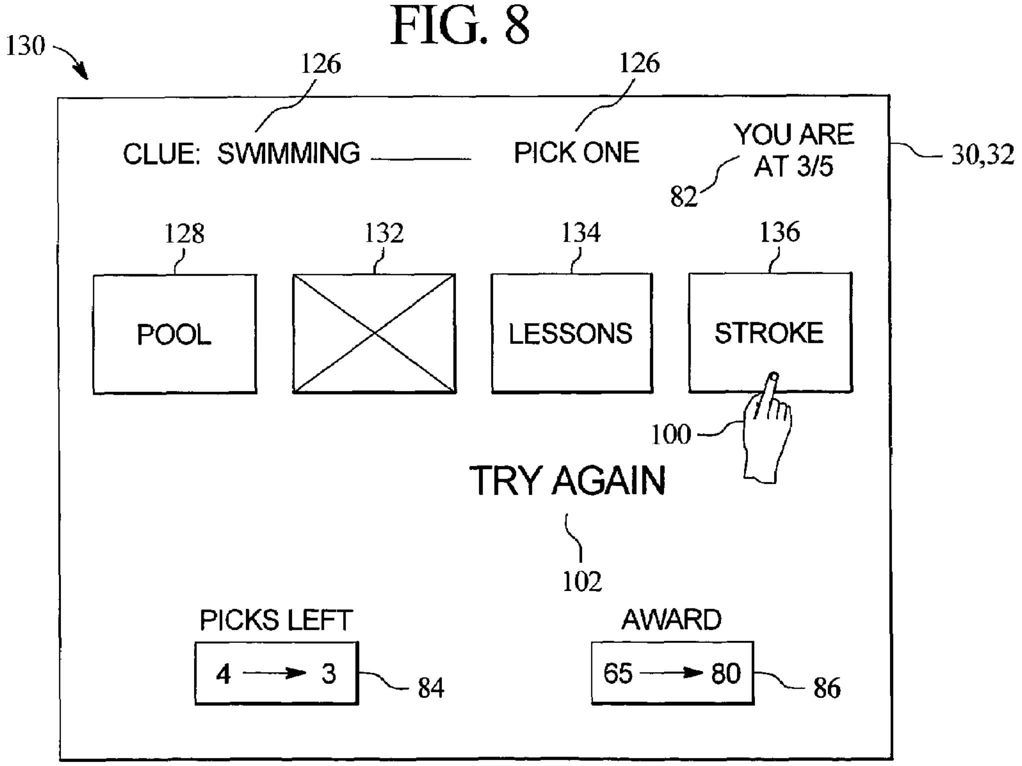

Screen 120 of FIG. 7 shows that the player now picks from the third of five selection levels as illustrated by indicator 82. The game provides a new clue 126, which is the clue "swimming ______." Message 126 also informs the player to pick one of the selections. Selections 128, 132, 134 and 136 each display a word, namely, words "pool", "trunks", "lessons", and "stroke" all of which complete the phrase "swimming ______." As illustrated by screen 120, player 100 picks the "trunks" selection 132, which yields the "try again" outcome 102.

As discussed above, the "try again" outcome requires the player's next pick to be from the same selection level and costs the player a pick, as illustrated by meter 84. The player receives an award of fifteen as illustrated by award meter 86. Table 70 illustrates that the "try again" outcome awards increase by five for each award level.

Screen 130 of FIG. 8 shows again the message 126 and the selections 128, 132, 134 and 136 as described above in FIG. 7. Player 100 picks again from award level three of five as illustrated by level indicator 82. The player 100 picks the "stroke" selection 136, which again yields the "try again" outcome 102. Outcome 102 reduces the player's picks from four to three as indicated by meter 84. The player's award again increases by fifteen to eighty as illustrated by display 86.

Figure 9:
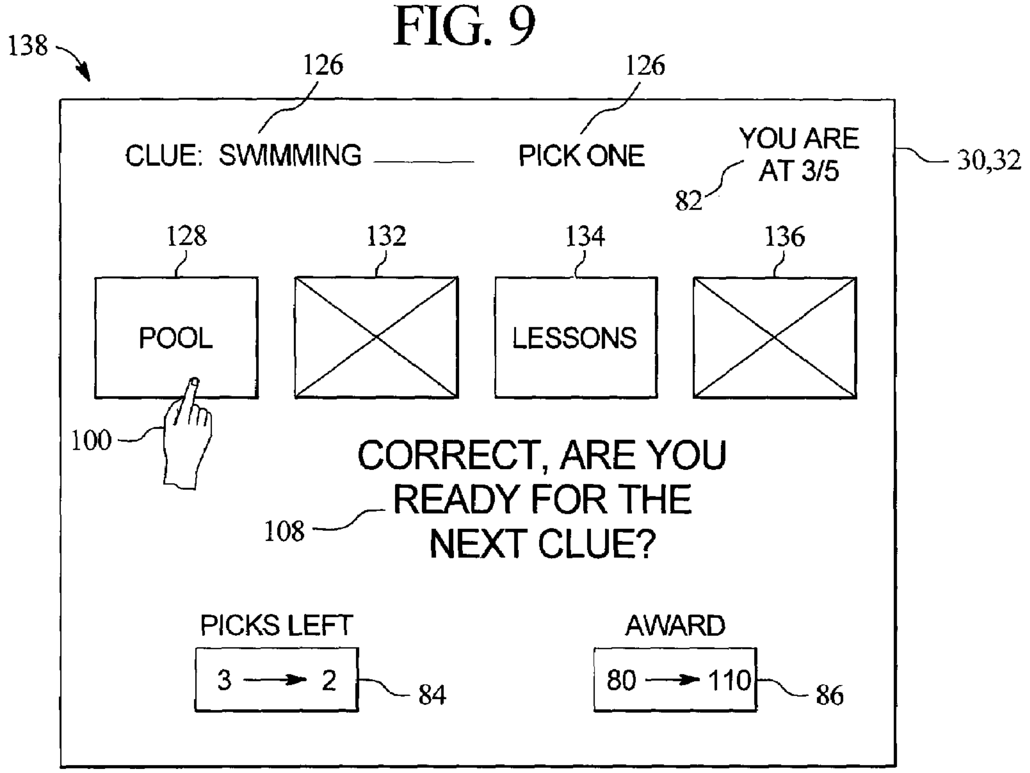

Screen 138 of FIG. 9 illustrates that upon the player's pick of the pool selection 128, the game yields the "correct" or "advance" outcome 108. The outcome 108 counts against the player's picks as shown in meter 84, and the player's award increases according to table 70 of FIG. 14 by thirty to a total of one hundred ten as seen in display 86.

Figure 10:
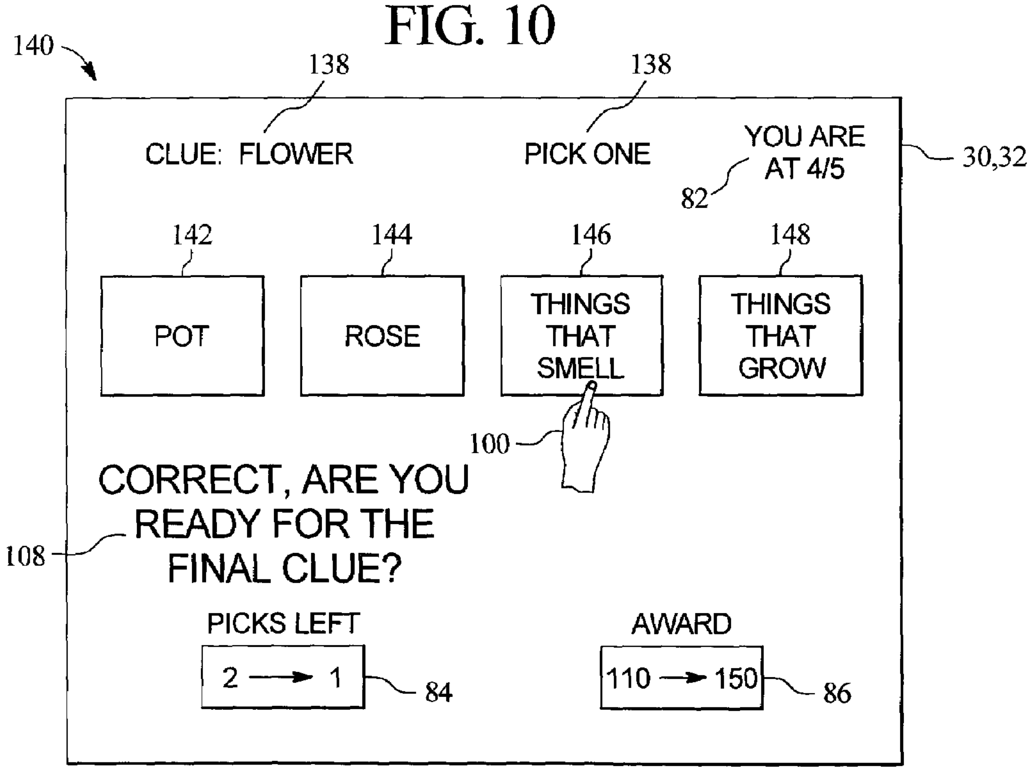

Screen 140 of FIG. 10 illustrates the player's first pick in the selection level four of five as indicated by level indicator 82. The game provides the clue of "flower" and informs the player to pick one of the selections as shown by message 138. Player 100 picks the "things that smell" selection 116, which again yields the "correct" outcome 108. "Correct" outcome 108 counts against the player's picks as indicated by meter 84. The player's award increases according to table 70 of FIG. 14 by forty as seen in award display 86.

Screens 150 and 160 both illustrate the player's final pick in the final selection group. It should be appreciated that depending on the outcomes of the player's prior picks, the player may have no picks in the final selection level, one pick, or have multiple picks in the final selection level. Level indicator 82 indicates that the player is picking from the final level. The final clue and the message to pick one of the selections is provided by message 152. Message 152 indicates that the final clue is a "famous president". Selections 154, 156, 158 and 162 each accordingly display the name of a famous president.

Figure 11:
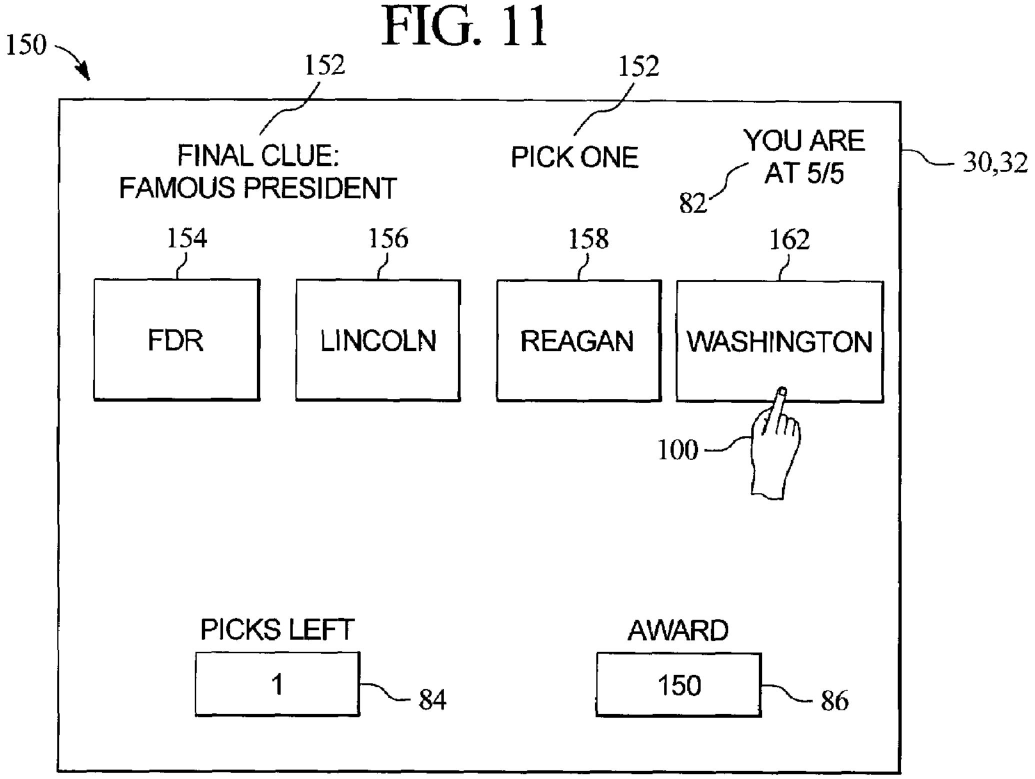
Figure 12:
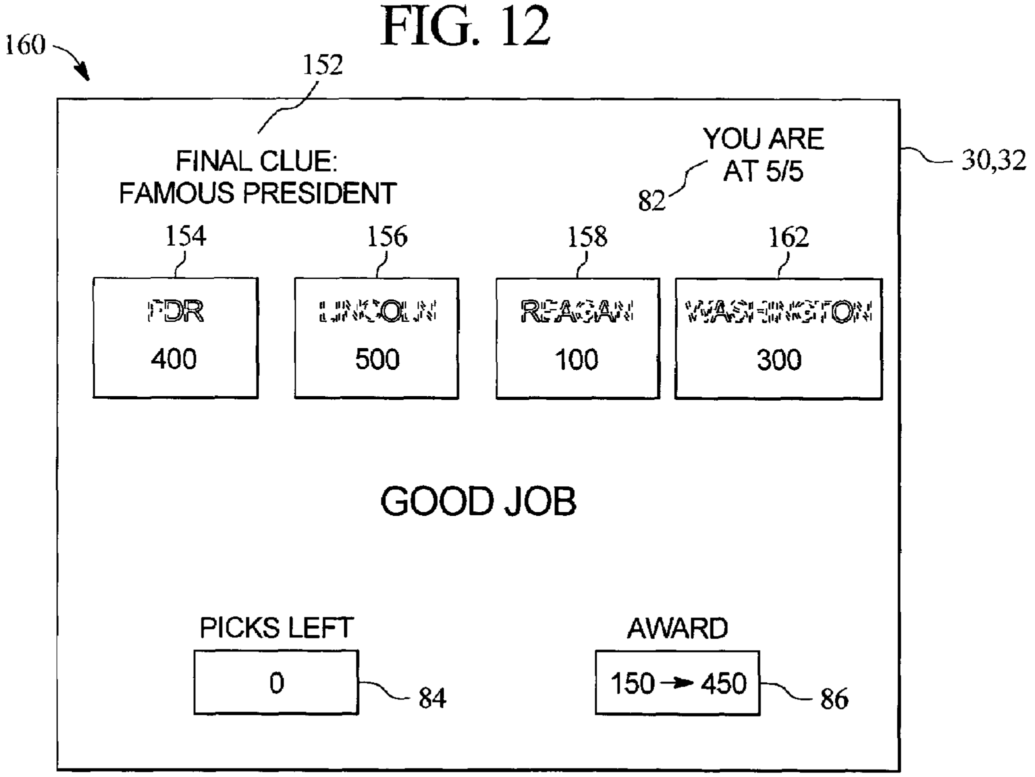

Screen 150 illustrates that player 100 selects the "Washington" selection 162. Because the level is the final level, the outcome of the pick is the provision of an award. Table 70 of FIG. 14 illustrates that the awards for the final selection group can vary between one hundred and five hundred. Award display 86 in FIGS. 11 and 12 show that the player received the award of three hundred, giving the player a total award for the game of four hundred fifty. The player's picks are reduced from one to none as illustrated by screens 150 and 160 and the picks remaining meter 84. An award range like the one shown in FIG. 14 for the fifth selection level can be used for any of the selection levels and for any of the different outcomes.

Screen 160 of FIG. 12 illustrates a reveal feature of the present invention. That is, the game reveals or displays each of the awards associated with each of the selections 154, 156, 158 and 162. The reveal feature shows the player the player's relative success in picking selection 162 as well as the awards that the player could have obtained by picking other selections. It should be appreciated that a reveal screen could be provided after the player picks a selection that yields the "correct" or "advance" outcome 108. Further, the selections could be revealed after the player receives the "pass" outcome 124. In an alternative embodiment, the reveal screen also reveals the correct, try again, pass, and/or award outcomes.

If the game illustrated in FIGS. 3 to 12 is a bonus game, the player adds four hundred fifty credits to the player's credit meter and returns the player to base game play. Otherwise, if the game is a base or primary game, the player is able to reinsert another wager to play the game again.

Figure 13:
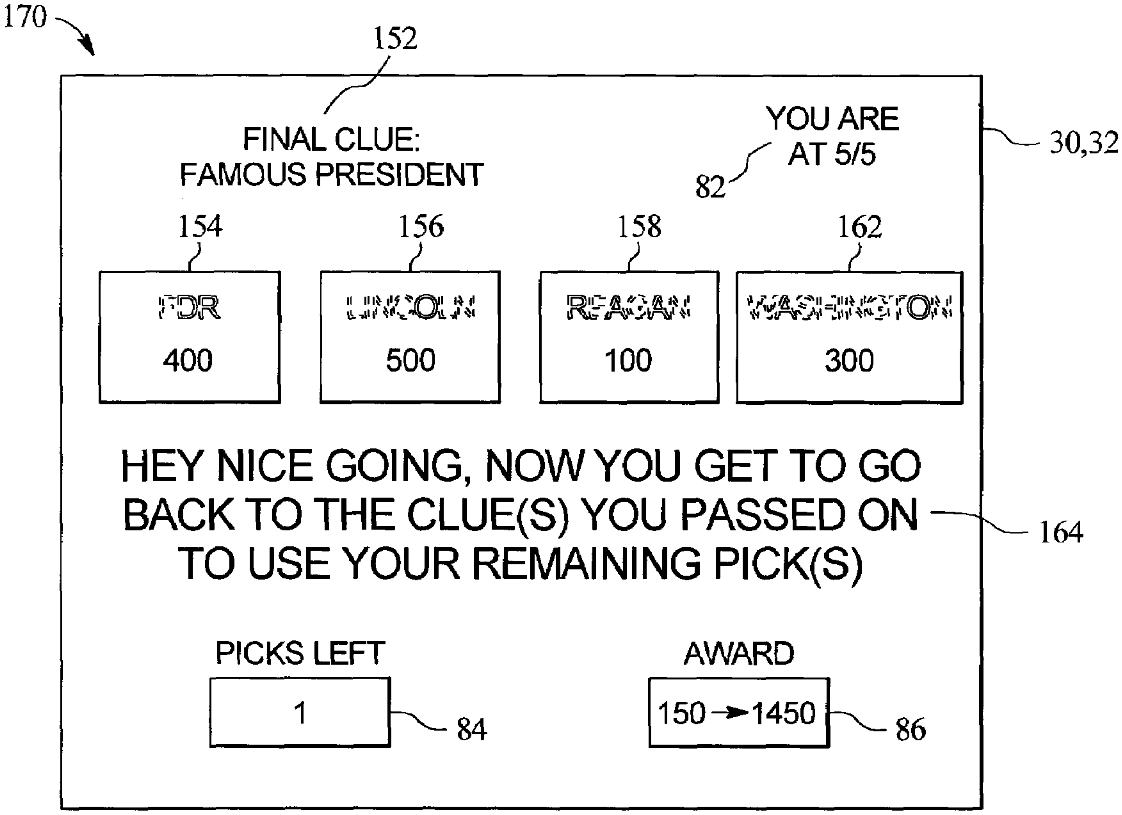
FIG. 13 is an elevation view of a screen shot of the gaming device illustrating an alternative embodiment for the multiple selection level game of the present invention.

Screen 170 of FIG. 13 illustrates an alternative embodiment. If the player is fortunate enough to have more than enough picks in the final selection group to pick each of the selections 154, 156, 158 and 162, the game in one embodiment enables the player to return to one or more of the levels in which the player received the "pass" outcome 124 so that the player can exhaust all remaining picks, as illustrated by message 164. In one embodiment, the wagering game returns the player to the lowest "pass" level and allows the player to work up from that level. In another embodiment, the game randomly decides which of two or more "pass" levels with which to return the player.

Award table 70 of FIG. 14 has been discussed previously in connection with the previous Figures illustrating one example of the present invention. Award table 70 increments the "try again" or "repeat" outcome awards by five, the "correct" or "advance" outcome awards by ten and the "pass" outcome awards by fifteen for each level until reaching the final level. The increments for each outcome as well as the relative weight or size of the awards between the different outcomes can vary. It should thus be appreciated that the pass outcome could be less than the correct outcomes. In the illustrated embodiment, for example, the pass outcome is worth more than the correct outcome, which in turn is worth more than the "try again" outcome. In other implementations, the relative weighting changes.

In an alternative embodiment, the game does not pay the player for one or more of the outcomes. For example, the gaming device, in one embodiment, does not pay the player for achieving a "pass" outcome. As discussed above, award ranges can be substituted for the fixed awards. Furthermore, likelihood percentages can be used in connection with different awards for different ranges so that one or more award is more likely to be generated than one or more other awards. In other embodiments, the "correct" or "try again" outcomes can be worth more than the "pass" outcome or all awards could be the same, as desired by the game implementor.

Referring now to FIG. 15, a level selection table 80 stored in memory device 40 is illustrated. In the screen shots of FIGS. 3 to 13, each of the award levels presented the player with four selections. In alternative embodiments, the levels include a different number of selections. Further alternatively, two levels can display different amounts of selections. Table 80 illustrates one example where levels one and two display five selections, levels three and four display four selections and level five displays three selections. Non-final levels include at least two selections in one preferred embodiment.

Table 80 also sets the percent loading of the different outcomes within each level. Level one includes three "try again" or "repeat" outcomes, two "correct" or "advance" outcomes and no "pass" outcomes. Level two includes three "try again" or "repeat" outcomes, one "correct" or "advance" outcome and one "pass" outcome. In one embodiment, the gaming device reduces the ability to advance to the next level either via the "correct" or "pass" outcomes as the levels get higher and higher. The percent loading of the outcomes versus the levels varies based on desirability and game mathematics. It is also possible that one or more of the levels do not include the "correct" outcome. As illustrated, the final or fifth level includes no "correct" or "pass" outcomes.

While not illustrated, the game and gaming device of the present invention include an optional fourth type of outcome or "stay" outcome. The "stay" outcome requires the player to pick again from the current selection group but does not count against the player's total number of picks. The "stay" outcomes may or may not yield an award value to the player. In one embodiment, the award value associated with the "stay" outcome is approximately the same as the value associated with the "try-again" outcome.

In an alternative embodiment, the gaming device can enable the player to select a "pass" for a level for the cost of one or more picks or credits (won in the game or as an additional wager). This embodiment enables the player to use a strategy to get to the potentially higher levels quicker and then possibly come back to one or more of the lower levels if the player has picks remaining.

It should also be appreciated that one or more extra picks of the selection can be associated with one or more of the selections including the selection with the "pass" on one or more levels.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one display device;

at least one input device; and at least one processor configured to operate with the at least one display device and the at least one input device to, for each of a plurality of plays of a game:

select one of a plurality of different levels, each of said plurality of different levels including a clue associated with that level and a plurality of responses to that clue, wherein the clue indicates at least two but less than all of the plurality of responses which are preferred responses, randomly select one of the at least two preferred responses to be a designated preferred response, wherein for a first of the plurality of plays of the game, a first one of the at least two preferred responses is the designated preferred response to a designated clue, and wherein for a second of the plurality of plays of the game, a different second one of the at least two preferred responses is the designated preferred response to said same designated clue, randomly associate each of a plurality of masked selections with one of the responses to the clue, wherein the masked selection associated with the designated preferred response includes a pay outcome, display the clue, the plurality of masked selections, and the plurality of associated responses of the selected one of the plurality of different levels, enable a player to make a number of picks of one of the masked selections, said number of picks being greater than one, wherein, for each of said picks of one of the masked selections:

(a) display a first result if said picked masked selection includes the pay outcome and a count against said number of picks, (b) display a second result if said picked masked selection includes a move to a next one of the levels outcome and a count against said number of picks, (c) display a third result if said picked masked selection includes another pick from the same selection level outcome and a count against said number of picks, and (d) display a fourth result if said picked masked selection includes a move to a next level outcome and does not include a count against the player's number of picks, and thereafter provide an award to the player based on any displayed first results resulting from the picks of the selections.

2. The gaming device of claim 1, wherein the at least one processor is configured to operate with the at least one display device to display a fifth result if said picked masked selection includes another pick from the same level outcome and does not include a count against said number of picks.

3. The gaming device of claim 1, wherein the plurality of different levels includes a final level, and wherein the at least one processor is configured to operate with the at least one display device to display the first result for any masked selection of said final level which is picked by the player.

4. The gaming device of claim 3, wherein the at least one processor is configured to operate with the at least one input device and the at least one display device to enable the player to make an additional pick from said determined one of the plurality of levels if the third result is displayed.

5. The gaming device of claim 4, wherein the at least one processor is configured to operate with the at least one input device to enable the player to make said additional pick only after at least one pick has been made from each of the plurality of different levels for the play of the game.

6. The gaming device of claim 1, wherein the award is additionally based on at least one selected from the group consisting of: (i) at least one value provided upon reaching a next one of the plurality of different levels; (ii) at least one value provided upon a display of the second result; (iii) at least one value provided upon a display of the third result; and (iv) at least one value provided upon a display of the fourth result.

7. The gaming device of claim 1, wherein an increasing average pay outcome is associated with each of a plurality of subsequent levels.

8. The gaming device of claim 1, wherein the award is additionally based on at least one value associated with a next selection level which is provided upon reaching said next selection level, wherein the at least one value associated with each subsequent level increases on average for a plurality of subsequent levels.

9. The gaming device of claim 1, wherein the award is additionally based on at least one additional value provided upon a display of the second result, said at least one additional value increasing on average for a plurality of subsequent levels.

10. The gaming device of claim 1, wherein the award is additionally based on at least one additional value provided upon a display of the third result, said at least one additional value increasing on average for a plurality of subsequent levels.

11. The gaming device of claim 1, wherein the award is additionally based on at least one additional value provided upon a display of the fourth result, said at least one additional value increasing on average for a plurality of subsequent levels.

12. The gaming device of claim 1, which is provided via at least one selected from the group consisting of: a data network and a computer storage medium.

13. The gaming device of claim 12, wherein the data network includes an internet.

14. The gaming device of claim 1, wherein any results to be displayed for any of the number of picks are determined prior to the player picking a first one of the masked selections for the play of the game.

15. A gaming device comprising:

at least one display device;

at least one input device; and at least one processor configured to operate with the at least one display device and the at least one input device to, for each of a plurality of plays of a game:

select one of a plurality of different levels, each of said plurality of different levels including a clue associated with that level and a plurality of responses to that clue, wherein the clue indicates at least two but less than all of the plurality of responses which are preferred responses to the clue, randomly select one of the at least two preferred responses to be a designated preferred response, wherein for a first of the plurality of plays of the game, a first one of the at least two preferred responses is designated preferred response to a designated clue, and wherein for a second of the plurality of plays of the game, a different, second one of the at least two preferred responses is the designated preferred response to said same designated clue, randomly associate each of a plurality of masked selections with one of the responses to the clue, wherein the masked selection associated with the designated preferred response includes a payout outcome, display the clue, the plurality of masked selections, and the plurality of associated responses of the selected one of the plurality of different levels, enable a player to make a number of picks of one of the masked selections from the plurality of different levels, said number of picks being greater than one, wherein for each of the picks of one of the masked selections:

display a "pay" symbol if said picked masked selection results in the payout outcome and a count against said number of picks, display an "advance" symbol if said picked masked selection results in a move to a next level outcome and a count against said number of picks, display a "repeat" symbol if said picked masked selection results in another pick from the same level outcome and a count against said number of picks, and display a "pass" symbol if said picked masked selection results in a move to a next level outcome without a count against said number of picks, and thereafter provide an award to the player based on any displayed "pay" symbols resulting from the picks of the masked selections.

16. The gaming device of claim 15, wherein the at least one processor is configured to operate with the at least one display device to display a "stay" symbol if said picked masked selection results in another pick from the same level outcome without a count against said number of picks.

17. The gaming device of claim 15, wherein the plurality of different levels includes a final level, and wherein the at least one processor is configured to operate with the at least one display device to display the "pay" symbol for any picked masked selection of the final level.

18. The gaming device of claim 15, wherein the at least one processor is configured to operate with the at least one display device to display the "advance" symbol as being associated with the "pay" symbol and to determine said award based on that association.

19. The gaming device of claim 15, wherein the at least one processor is configured to operate with the at least one display device to display at least one selected from the group consisting of: the "advance" symbol, the "repeat" symbol, and the "pass" symbol as being associated with the "pay" symbol and to determine said award based on that association.

20. The gaming device of claim 15, wherein at least two different levels include at least two different percentages of the masked selections of those levels which result in a display of the "advance", "repeat," or "pass" symbols.

21. The gaming device of claim 15, wherein at least one of the levels does not include any masked selection which, if picked, results in a display of the "advance", "repeat," or "pass" symbols.

22. The gaming device of claim 15, which is provided via at least one selected from the group consisting of: a data network and a computer storage medium.

23. The gaming device of claim 22, wherein the data network includes an internet.

24. The gaming device of claim 15, wherein any symbols to be displayed for any of the number of picks of the masked selections are determined before the player picks a first one of the masked selections for the play of the game.

25. A method of operating a gaming device providing a plurality of plays of a game, each play of the game operable upon a wager, said method comprising:

(a) selecting a first selection level of a plurality of selection levels, wherein each selection level includes a clue and a plurality of responses to that clue, wherein the clue indicates at least two but less than all of the plurality of responses which are preferred responses to the clue;

(b) randomly selecting one of the at least two preferred responses to be a designated preferred response, wherein for a first of the plurality of plays of the game, a first one of the at least two preferred responses is the designated preferred response to a designated clue, and wherein for a second one of the plurality of plays of the game, a different second one of the at least two preferred responses is designated preferred response to the same designated clue;

(c) randomly associating each of a plurality of masked selections with one of the responses to the clue, wherein the masked selection associated with the designated preferred response includes a first type of outcome;

(d) causing a display device of the gaming device to display the clue, the plurality of masked selections, and the plurality of associated responses of the first selection level;

(e) providing a player a total number of picks of the masked selections;

(f) enabling the player to pick one of the masked selections associated with the first selection level;

(g) counting the pick against the total number of picks and enabling the player to pick from a next selection level if the pick results in the first type of outcome;

(h) counting the pick against the total number of picks and enabling the player to pick again from the first selection level if the pick results in a second type of outcome;

(i) not counting the pick against the total number of picks and enabling the player to pick from the next selection level if the pick results in a third type of outcome; and (j) providing an award to the player based on any picks of any masked selections.

26. The method of claim 25, which includes, if said pick results in the first type of outcome or the third type of outcome, determining the next selection level from the plurality of selection levels and displaying the clue and the plurality of masked selections associated with said next selection level.

27. The method of claim 25, which includes determining the next selection level from the plurality of selection levels and repeating (b) to (i) at least once for said next selection level.

28. The method of claim 25, which includes providing the award to the player based on at least one value associated with at least one of the picked masked selections.

29. The method of claim 25, which includes providing the award to the player upon enabling the player to pick from the next selection level.

30. The method of claim 25, which includes providing the award to the player upon the player picking one of the masked selections associated with the first outcome.

31. The method of claim 25, which includes providing the award to the player upon the player picking one of the masked selections associated with the second outcome.

32. The method of claim 25, which includes providing the award to the player upon the player picking one of the masked selections associated with the third outcome.

33. The method of claim 25, which is provided via at least one selected from the group consisting of: a data network and a computer storage medium.

34. The method of claim 33, wherein the data network includes an internet.

* * * * *

UNITED STATES PATENT AND TRADEMARK OFFICE

CERTIFICATE OF CORRECTION

PATENT NO. : 7,544,129 B2
APPLICATION NO. : 10/657365
DATED : June 9, 2009
INVENTOR(S) : Anthony J. Baerlocher It is certified that error appears in the above-identified patent and that said Letters Patent is hereby corrected as shown below:

In Column 3, Line 64, change “standing or sifting” to --standing or sitting--.

In Column 3, Line 67, change “preferably while sifting” to --preferably while sitting--.

In Column 5, Line 28-29, change “which preferable moves one or more” to --which preferably moves one or more--.

In Column 6, Line 18, change “As seen in FIGS, 1A, 1B and 2” to --As seen in FIGS, 1A, 1B and 2A and 2B--.

In Column 7, Line 52-53, change “Award based on a winning hand and the credits wagered is provided to the player.” to --An award based on a winning hand and credits wagered is provided to the player.--.

In Column 9, Line 39-40, change “a series of game outcomes such a free games.” to --a series of game outcomes such as free games.--.

In Column 10, Line 36-37, change “or other internet facilitator are available” to --or other internet facilitators are available--.

Signed and Sealed this

Ninth Day of February, 2010

David J. Kappos
*Director of the United States Patent and Trademark Office*